D. A. SWANSON.
Combined Hand Corn-Planter and Fertilizer-Distributer.
No. 224,242. Patented Feb. 3, 1880.
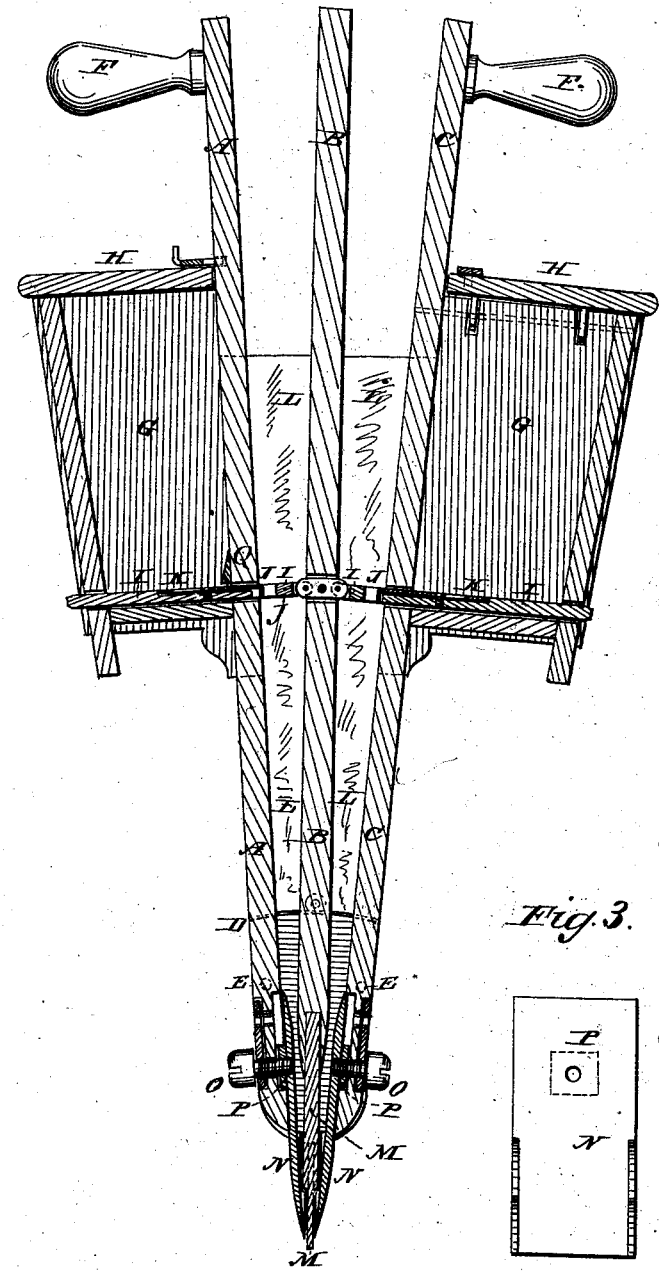
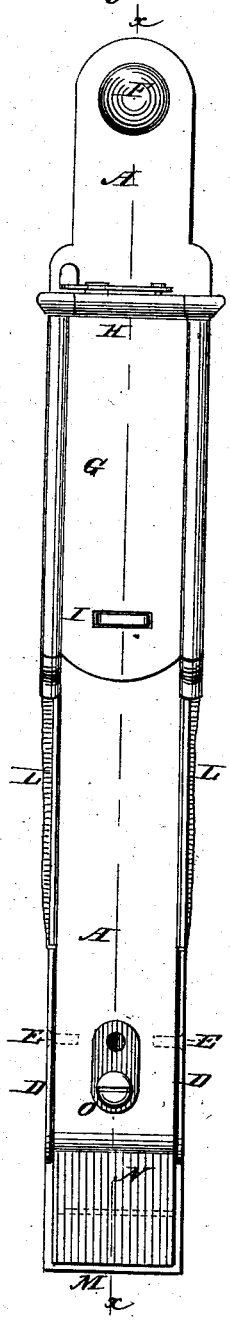
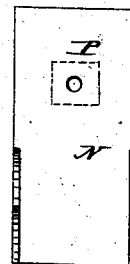
WITNESSES:
INVENTOR:
D. A. Swanson
BY 
ATTORNEYS.

UNITED STATES PATENT OFFICE.

DAVID A. SWANSON, OF RIO GRANDE, OHIO.

COMBINED HAND CORN-PLANTER AND FERTILIZER-DISTRIBUTER.

SPECIFICATION forming part of Letters Patent No. 224,242, dated February 3, 1880.

Application filed December 2, 1879.

*To all whom it may concern:*

Be it known that I, DAVID AUGUSTUS SWANSON, of Rio Grande, in the county of Gallia and State of Ohio, have invented a new and useful Improvement in Combined Hand Corn-Planter and Fertilizer-Dropper, of which the following is a specification.

Figure 1 is a sectional side elevation of my improvement, taken through the line $x\ x$, Fig. 2. Fig. 2 is a front elevation. Fig. 3 is a side elevation of one of the jaws.

Similar letters of reference indicate corresponding parts.

The object of this invention is to furnish combined hand corn-planters and fertilizer-droppers so constructed that the corn and fertilizer will be deposited at the same time and at the same depth or at different depths, as required.

A B C are three narrow boards of suitable length. To the side edges of the lower end of the middle board, B, are rigidly attached two plates, D, to and between the upper parts of the side edges of which are pivoted the lower parts of the side boards, A C, by screws E, passing through the said plates D and into the side edges of the said side boards, A C.

To the outer sides of the upper ends of the side boards, A C, are attached handles F, by means of which the machine is carried and operated.

To the outer sides of the side boards, A C, a little below the handles F, are attached boxes or hoppers G, one of which is designed to receive corn and the other bone-dust, ashes, lime, or other fine fertilizer.

The hoppers G are provided with covers H. The corn and fertilizer are removed from the hoppers G by the sliding bars I, which rest upon the bottoms of the said hoppers G, and work through holes in the outer sides of the hoppers G and in the side boards, A C.

In the sliding bars I are formed holes J, to receive the corn and fertilizer and remove them from the hoppers G. The size of the holes J is regulated by plates K, the ends of which are bent down to enter the holes J, and form one side of the said holes.

The plates K are slotted to receive the screws by which they are secured to the bars I, so that they may be adjusted as may be required.

The inner ends of the sliding bars I are hinged to the center board, B.

With this construction, as the upper ends of the side boards, A C, are moved inward against the center board, B, the holes J of the bars I enter the hoppers G and become filled, the one with corn and the other with the fertilizer. As the upper ends of the side boards, A C, are moved outward, the holes J of the slides I enter the spaces between the side boards, A C, and the center board, B, and drop the corn and fertilizer into the said spaces.

The dropping-slides I are kept from carrying out any more than enough to fill their dropping-holes by leather cut-offs Q, attached to the side boards, A C, just above the holes through which the said slides I work. The corn and fertilizer are kept from falling out between the side edges of the boards A B C by strips L, of oil-cloth, leather, or other suitable material, attached to the said edges, and which are made of such a width as to allow the side boards, A C, to have a free movement.

To the lower end of the center board, B, is rigidly attached the center jaw, M, which has shoulders formed upon the lower parts of its sides, making its lower part thinner, as shown in Fig. 1. N are the side jaws, which are secured to the inner sides of the lower ends of the side boards, A C, by screws O. The screws O pass through holes in the side boards, A C, and screw into nuts P, formed upon or attached to the side jaws, N.

Two holes are formed in each of the side boards, A C, to receive the screws O, so that the side jaws, N, may be raised and lowered as required.

With this construction, as the upper ends of the side boards, A C, are moved inward to bring the holes J of the sliding bars I into the hoppers G to be again filled, the lower ends of the said side boards, A C, are moved apart, and allow the corn and fertilizer between them and the center board, B, to drop out into the hole formed in the soil by thrusting the closed jaws N M N into the soil. With this construction, by adjusting the side jaws, N, at the same height, the corn and fertilizer will be dropped together. By adjusting one of the jaws N higher than the other the fertilizer may be deposited below or above the corn and not in contact with it. This adjustment allows new ashes to be dropped with the corn in such a way that it will not injure the corn, and at the same time will protect the corn from any cut-worms that may be in the soil.

Having thus described my invention, I claim as new and desire to secure by Letters Patent—

In a combined hand corn-planter and fertilizer-dropper, the combination, with the stationary center board, B, and the two pivoted side boards, A C, of the stationary center jaw, M, the two adjustable side jaws, N N, and the screws O O, substantially as herein shown and described, whereby the machine may be made to deposit the corn and fertilizer at the same depth or at different depths, as set forth.

DAVID AUGUSTUS SWANSON.

Witnesses:
  J. C. GROSS,
  J. T. SHERRITT.